US006501799B1

(12) United States Patent
Kohn

(10) Patent No.: US 6,501,799 B1
(45) Date of Patent: Dec. 31, 2002

(54) DUAL-PRIME MOTION ESTIMATION ENGINE

(75) Inventor: Leslie Kohn, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/128,730

(22) Filed: Aug. 4, 1998

(51) Int. Cl.[7] ................................................. A04B 1/66
(52) U.S. Cl. ............................ 375/240.16; 375/240.24
(58) Field of Search .......................... 348/416, 415, 348/417, 699, 700, 412, 403, 405, 409, 420, 407; 382/282, 179, 180, 277; 375/240, 240.24

(56) References Cited

U.S. PATENT DOCUMENTS

| 5,448,310 A | * | 9/1995 | Kopet et al. | 348/699 |
| 5,453,799 A | | 9/1995 | Yang et al. | 348/699 |
| 5,510,857 A | * | 4/1996 | Kopet et al. | 348/699 |
| 5,619,268 A | * | 4/1997 | Kobayashi et al. | 348/416 |
| 5,623,313 A | | 4/1997 | Naveen | 348/416 |
| 5,648,819 A | | 7/1997 | Tranchard | 348/416 |
| 5,650,823 A | | 7/1997 | Ngai et al. | 348/415 |
| 5,684,534 A | * | 11/1997 | Harney et al. | 375/240 |
| 5,801,778 A | * | 9/1998 | Ju | 348/416 |
| 5,905,542 A | * | 5/1999 | Linzer | 348/699 |
| 5,920,359 A | * | 7/1999 | Curtley et al. | 348/399 |
| 5,946,042 A | * | 8/1999 | Kato | 348/416 |
| 6,049,362 A | * | 4/2000 | Butter et al. | 348/699 |

OTHER PUBLICATIONS

Varhol, P. "Mainstream processors gain DSP features," *Hardware*, pp. 29–32, Sep. 1997.

* cited by examiner

*Primary Examiner*—Chris Kelley
*Assistant Examiner*—Gims Philippe
(74) *Attorney, Agent, or Firm*—Christopher P. Maiorana, PC

(57) ABSTRACT

An apparatus performs motion estimation based on an average of previous field references in a flexible, yet high performance manner. The apparatus has a command memory for storing a motion estimation command list segment which in turn contains a search command for specifying a merged search operation over one or more search positions. The apparatus also has a score memory for storing the result of each merged search operation. The score memory is initialized when the merged search operation is initiated. During the search operation, the score memory accumulates the result of each search position. The apparatus also has a search engine connected to the command memory and to the score memory for determining from the score memory a search position with the lowest score. The search engine then generates dual prime motion estimation outputs in the form of motion estimation result list segments.

30 Claims, 8 Drawing Sheets

DUAL-PRIME MOTION ESTIMATION ENGINE

BACKGROUND OF THE INVENTION

The invention relates to apparatus and methods for encoding video and image data, and in particular, to apparatus and methods for performing dual prime motion estimation.

The emergence of multimedia computing is driving a need for digitally transmitting and receiving high quality motion video. The high quality motion video consists of high resolution images, each of which requires a large amount of space in a system memory or on a data storage device. Additionally, about 30 of these high resolution images need to be processed and displayed per second in order for a viewer to experience an illusion of motion. As a transfer of large, uncompressed streams of video data is time consuming and costly, data compression is typically used to reduce the amount of data transferred per image.

In motion video, much of the image data remains constant from one frame to another frame. Therefore, video data may be compressed by first describing a reference frame and then describing subsequent frames in terms of changes from the reference frame. Standards from an organization called Motion Pictures Experts Group (MPEG) have evolved to support high quality, full motion video. A first standard (MPEG-1) has been used mainly for video coding at rates of about 1.5 megabit per second. To meet more demanding application, a second standard (MPEG-2) provides for a high quality video compression, typically at coding rates of about 3–10 megabits per second.

An example of the MPEG compression process is discussed next. Generally, a first frame may not be described relative to any other frame. Hence, only intra (I) frame or non-predictive coding is performed on the first frame. When a second frame is received, the second frame may be described in terms of the I frame and a first forward predicted (P) frame. The compression of the received second frame is delayed until receipt of the first P frame by a processing system. In a similar manner, a third frame is also described in terms of the first I and P frames. The first P frame is formed by predicting a fourth received frame using the first I frame as a reference. Upon computation of the first P frame, the motion estimation engine can process the second and third received frames as bidirectionally (B) predicted frames by comparing blocks of these frames to blocks of the first I and P frames.

One primary operation performed by the motion estimation engine is block matching. The block matching process identifies a block of image data that should be used as a predictor for describing the current target block. To identify the proper predictor, tokens containing blocks of picture elements (pel) such as a 16×16 pel block describing the current macroblock are received and compared against the content of a search window.

The block matching process computes a mean absolute difference (MAD) between data stored in the target block and blocks at various offsets in the search window. In this process, corresponding data from the two blocks being compared are subtracted, and the sum of the absolute values of the pel differences are calculated. The smaller the MAD, the better the match between the blocks. The motion estimation engine keeps track of the smallest MAD computed during the search process to determine which of the block in the search window is the best match to the input token. A motion vector describing the offset between the current frame and the best match block is then computed. The motion vector is subsequently sent back to a host processor in the form of an output token.

Although the motion estimation process may be a full, exhaustive block matching search, a multiple step hierarchical search to either a full or a half pixel search resolution is generally performed. In the hierarchical search approach, a best matching block is first found using a low resolution macroblock containing fewer data points than the full resolution image. Once the best matching block has been found, a full resolution search in the vicinity of the best matching block can be performed. This sequence reduces the total number of computations that must be performed by the motion estimation engine as fewer individual pel comparisons are performed in the reduced resolution image. Hence, the appropriate macroblock from which to compute the motion vector is more quickly determined.

Moreover, the MPEG-2 introduces a concept of a dual prime motion compensation in Section 7.6.3.6 of the MPEG H.262 specification. In dual prime motion compensation, a macroblock prediction is computed from an average of two previous field references, one with a same parity (top to top or bottom to bottom fields) and one with an opposite parity (top to bottom or bottom to top fields). Motion vectors for each field are coded as a common motion vector for the same parity fields and a small difference motion for the opposite parity fields. Ideally, the search of the target and reference fields is to be coordinated to minimize the overall error.

Once the motion vector for a macroblock is known relative to a reference field of the same parity, it is extrapolated or interpolated to obtain a prediction of the motion vector for the opposite parity reference field. This prediction is adjusted by adding a small shift to account for a half-pel vertical offset between the two fields. Then, small horizontal and vertical corrections (+1, 0, −1) coded in the bitstream are added. In calculating the pel values of the prediction, motion-compensated predictions from the two reference fields are averaged to reduce noises in the data.

If a field picture is being coded, the coded motion vector is applied to the reference field of the same parity. Obtaining the motion vector for the opposite parity field between the two fields generally involves interpolation. If a frame picture is being coded, the coded motion vector is applied to fields of the same parity, but a single vector is used for both fields. Obtaining motion vectors for the opposite parity fields in a frame picture involves both interpolation and extrapolation, but the computation is otherwise the same.

As the dual prime motion estimation process is compute intensive, dedicated hardware is typically used to perform this function. The hardware may be coupled tightly to a processor or alternatively, may be implemented as a hard wired control logic. A tight coupling with the processor allows flexibility in implementing the search process. Flexibility is desirable, as different video applications would benefit from different levels of processing.

Although flexible, the tight coupling approach does not provide as high performance as the hard wired approach. The hard wired approach delivers high performance as it minimizes the burden of motion estimation searching on the processor and thus releases processing cycles otherwise needed for the encoding process. However, the performance associated with the hard wired approach is achieved at the expense of reductions in the flexibility of handling complex search operations.

SUMMARY

An apparatus performs dual prime motion estimation based on an average of previous field references in a flexible, yet high performance manner. The apparatus has a command memory for storing a motion estimation command list segment which in turn contains a search command for specifying a merged search operation over one or more search positions. The apparatus also has a score memory for storing the result of each merged search operation. The score memory is initialized when the merged search operation is initiated. During the search operation, the score memory accumulates the result of each search position. The apparatus also has a search engine connected to the command memory and to the score memory for determining from the score memory a search position with the lowest score. The search engine then generates dual prime motion estimation outputs in the form of motion estimation result list segments.

Implementations of the invention include the following. The search command has a merge bit to select a merged search operation. Accordingly, when the merge bit of a current search command is set and the merge bit of a previous search command is cleared, indicating the start of a merged search operation, the score memory is initialized to the score for each search position. Moreover, when the merge bit of the previous search command is set, indicating that the merged search operation is in progress, the score memory accumulates the result for each search position. Further, when the merge bit of the current search command is cleared and the merge bit of the previous command is set, indicating the end of the merged search operation, a search result is generated by locating in the score memory a search position with the lowest accumulated score wile the score is being generated.

Implementations of the invention additionally include the following. The apparatus may estimate a common vector using merged search operations on fields spaced two temporal units apart at a first pel grid resolution with a common input velocity estimate, a merged search operation on adjacent fields at a second pel grid resolution with a first scaled common input velocity estimate, and a merged search operation on fields spaced three temporal units apart at a third pel grid resolution with a second scaled common input velocity estimate. The first pel grid resolution is a ½ pel grid resolution, the second pel grid resolution is a ¼ pel grid resolution, the third pel grid resolution is a ¾ pel grid resolution, the first scaled common input estimate is ½ of the common input velocity estimate, and the second scaled common input estimate is 3/2 of the common input velocity estimate.

The apparatus also may estimate a differential vector using a merged search operation on adjacent fields at a pel grid resolution with a first scaled common input velocity estimate and a predetermined search range, and a merged search operation on fields spaced three temporal units apart at the pel grid resolution with a second scaled common input velocity estimate and the predetermined search range. The pel grid resolution is a ½ pel grid resolution, the first scaled common input velocity estimate is ½ of the common input velocity estimate, the second scaled common input velocity estimate is 3/2 of the common input velocity estimate and the predetermined search range is one.

Implementations of the invention further include the following. The search engine compensates for differing search grid resolutions between same and opposite parity motion vector searches. Moreover, temporally adjacent fields are compensated by duplicating a search result to four score memory positions.

Advantages of the present invention include the following. The apparatus off-loads much of the dual prime motion estimation processing from the processor while allowing the processor to retain full control of critical search parameters, including the number of levels, search regions and range, target size, horizontal and vertical decimation, field versus frame search, among others. Moreover, the dual prime search operation takes advantage of information not available to the heuristics approach and is thus more efficient. Further, the dual prime search operation is faster than a brute force approach which exhaustively searches for all possible vectors in arriving at a search position with a minimal score. Thus, flexibility and high performance are maintained by the invention.

DESCRIPTION

Figure 1:
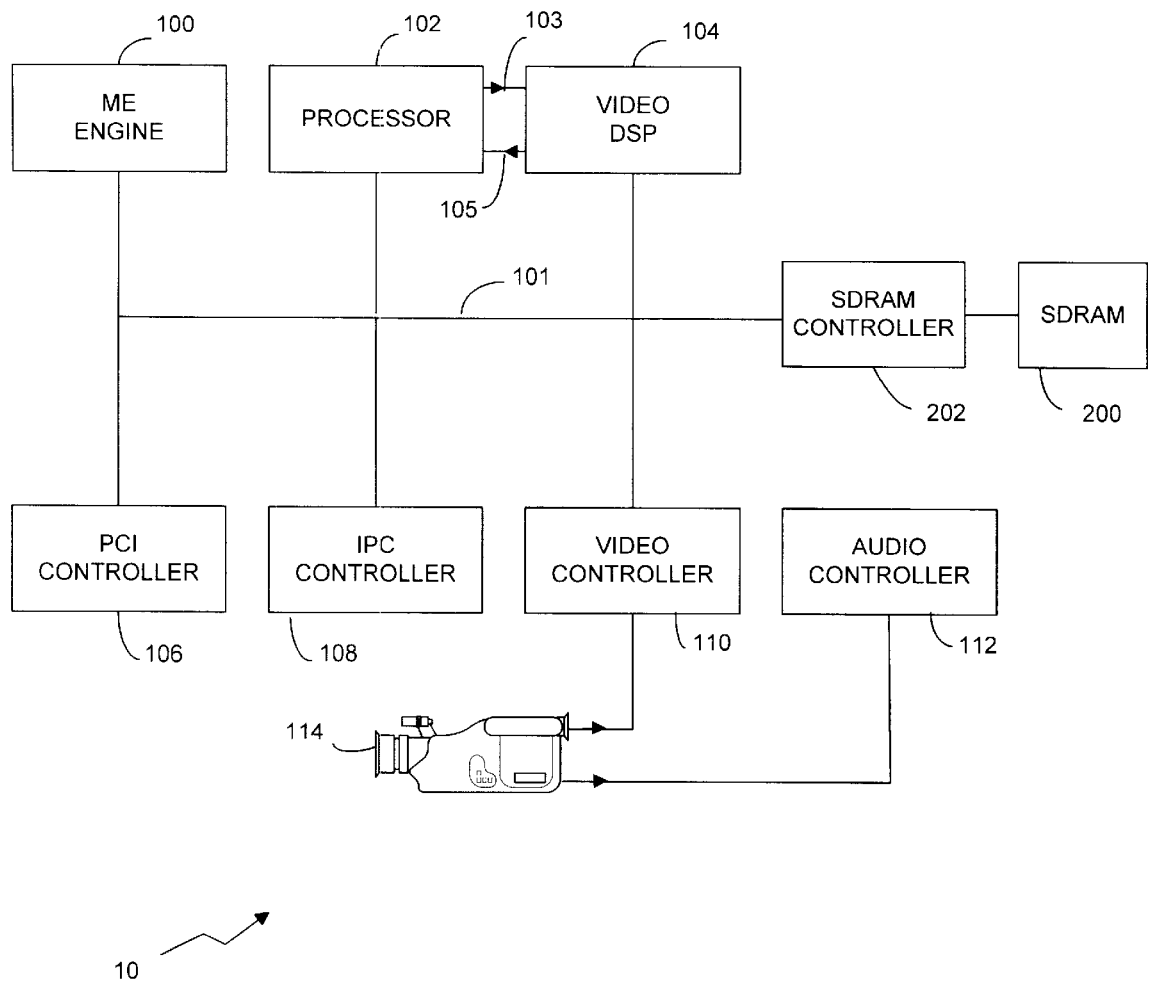
FIG. 1 is a schematic diagram of an image processing system.

FIG. 1 is a diagram illustrating a system 10 for processing and encoding video, image, and multimedia data. In the system 10, a motion estimation (ME) engine 100, which handles block matching operations, among others, is connected to a bus 101. The bus 101 is connected to a synchronous dynamic random access memory (SDRAM) controller 202, which controls an SDRAM array 200 having a plurality of SDRAM banks. The controller 202 manages SDRAM access operations as well as refresh operations of the SDRAM array 200. The SDRAM array 200 provides data storage for search command lists and frames of picture elements in the video data, among others. Preferably, a consistent representation is used for all frame data stored in the SDRAM 200, including reference frames, video channel input, and frames being coded.

As the controller 202 is responsible for generating all SDRAM addresses, it knows the address pattern ahead of time and is able to optimally schedule block accesses. The controller 202, along with the image data layout in memory, optimizes access time of the SDRAM 200 by sequencing the transfers to encourage multiple page hits within an SDRAM bank. Additionally, the efficiency of the SDRAM 200 is enhanced as precharge and row access operations of one SDRAM bank can take place at the same time as the data transfer operation of the other bank.

Also connected to the bus 101 is a processor 102 and a video digital signal processor (DSP) 104. The processor 102 is a general purpose central processing unit such as a SPARC processor, available from Sun Microsystems, Inc. of Mountain View, Calif. The video DSP 104 is a high level signal processing coprocessor that extends the instruction set of the processor 102 to include image filtering, activity, forward and inverse discrete cosine transformation (DCT), quantization, coding and decoding, and compositing operations. The video DSP 104 works in parallel with the processor 102 to off-load compute intensive pixel level processing operations. Internally, the video DSP 104 contains a separate DMA processor and a DSP processor connected by a double buffered working memory. The DMA processor transfers data to and from the external SDRAM 200 while the DSP processor performs signal processing operation. The processor 102 communicates with the video DSP 104 via an instruction bus 103 and a result bus 105.

Generally, when a DSP instruction is decoded by the processor 102, it is sent to the video DSP 104 for execution over the instruction bus 103. The instructions to the video DSP 104 are queued in two first in first out (FIFO) devices so that control code running on the processor 102 may execute in parallel with signal processing code running on the video DSP 104. Additionally, the output from the video DSP 104 are also buffered by another FIFO which is read by the processor 102. More details on the interactions between the processor 102 and the video DSP 104 are disclosed in copending, commonly assigned application Ser. No. 08/949,991, entitled "Out of Order Instruction Processing" and application Ser. No. 80/950,379 entitled "Instruction Execution", both filed on Oct. 14, 1997 and hereby incorporated by reference.

The bus 101 is also connected to a plurality of devices, including a peripheral component interface (PCI) controller 106, an interprocessor channel (IPC) controller 108, a video controller 110 and an audio controller 112. The video controller 110 and the audio controller 112 are connected to a multimedia source such as a camera 114, among others. The PCI controller 106 allows the system 10 to be plugged into a personal computer or workstation with PCI slots for subsequent storage and handling of the video data.

The IPC controller 108 allows a plurality of systems 10 to operate in parallel to support high quality and high resolution videos. Using the IPC controller 108, each image processing system 10 may be assigned a horizontal slice of an image frame to process. As the search region of one image processing system 10 overlaps with neighboring slices, image reference data from the overlap region needs to be transmitted between each system 10 over the IPC controller 108. The daisy chain arrangement of multiple systems 10 using the IPC controller 108 advantageously exploits a locality of reference data transfers. Hence, the IPC controller 108 avoids bottlenecks associated with a shared bus architecture and is easily scalable to provide additional processing power if needed.

Figure 2:
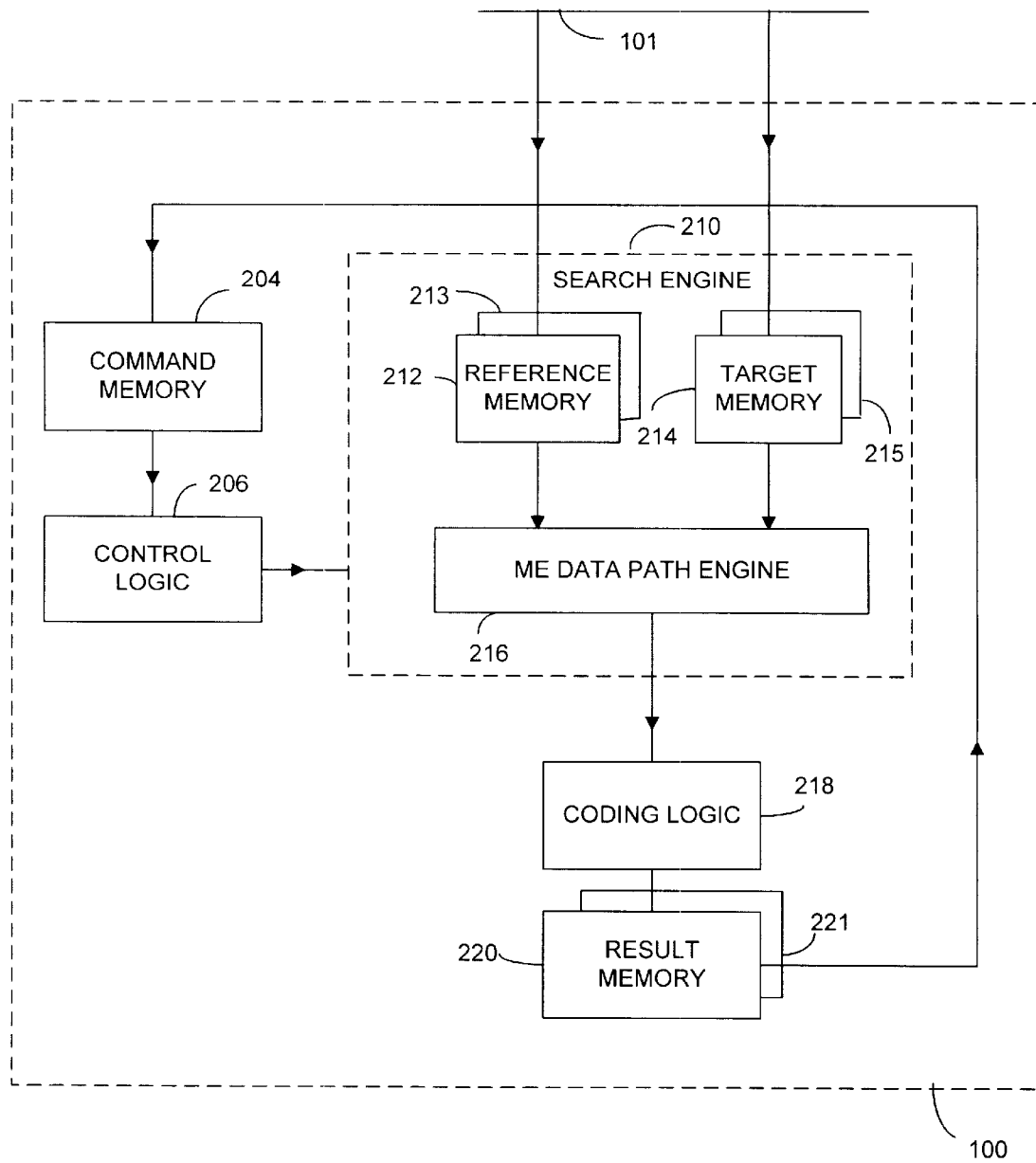
FIG. 2 is a schematic diagram of a motion estimation engine of FIG. 1.

FIG. 2 shows in more detail the ME engine 100. The ME engine 100 has a command memory 204 which receives command lists from the SDRAM 200 over the bus 101. The command memory 204 in turn provides data to a control logic 206 which controls a search engine 210. The search engine 210 has a pair of reference window memory (WMEM) 212 and 213 for storing reference image segments and a pair of target memory (TMEM) devices 214 and 215 for storing target image segments. The inputs of WMEMs 212 and 213 as well as TMEMs 214 and 215 are connected to the bus 101 to receive data from the SDRAM 200. As each search command is processed by the control logic 206, the appropriate target and reference image data for that target are loaded by the ME engine 100 from the SDRAM 200 into the appropriate WMEM 212 or 213 and TMEM 214 or 215. The outputs of the WMEMs 212 and 213 and the TMEMs 214 and 215 are then provided to a motion estimation data path engine 216.

In one embodiment, the WMEMs 212 and 213 are 32×32 memory devices while the TMEMs 214 and 215 are 16×16 memory devices. The TMEM 214 or 215 contains a block of data from each field, except for field pictures where the TMEM 214 or 215 contains targets from one field only. For frame searches, the WMEM 212 or 213 contains interleaved data from both reference fields. Similarly, the TMEM 214 or 215 is also accessed in an interleaved fashion. For field searches, the WMEM 212 or 213 contains data from the reference field being searched and the TMEM 214 or 215 fields are accessed separately, that is, they are non-interleaved.

The double buffering of the image reference regions using the WMEMs 212 and 213, as well as the target regions using TMEMs 214 and 215, allows the ME data path engine 216 to operate on one of the WMEM/TMEM pairs 212/214 or 213/215 while the other is loading data from the SDRAM 200. The double-buffering thus hides latencies associated with accessing the DRAM 200 from the operation of the data path engine 216.

The output of the data path engine 216 is provided to a coding logic 218 for handling, including the tokenizing of results. The output of the coding logic 218 is provided to a pair of result memory devices 220 and 221. The pair of result memory devices 220 and 221 are connected to the bus 101 to transmit results back to the SDRAM 200 via the SDRAM controller 202.

During operation, the ME engine 100 is controlled by a list of search commands stored in the SDRAM 200. The commands are downloaded into the command memory 204 and executed by the control logic 206. The control logic 206 decodes the search command and causes the ME engine 100 to load data from the SDRAM 200 to the WMEM 212 or 213 and the TMEM 214 or 215. The double buffering of the WMEMs and TMEMs allows the loading of the next image region to overlap with the processing of the current image region.

After receiving data from the WMEM 212 or 213 and the TMEM 214 or 215, the data path engine 216 performs a sum of 64 absolute differences. This is accomplished by sliding an 8×8 reference region over an 8×8 target region and computing the differences in parallel. The absolute differences are used to compute the MAD. The output of the data path engine 216 is processed by the coding logic 218 before stored in one of the result memory banks 220 or 221.

In the manner discussed above, after the processor 102 has set up various control registers and loaded search commands into the SDRAM 200, the ME engine 100 can independently operate on the list of search commands loaded from the SDRAM 200. After processing has completed, the ME engine 100 can write results back to the SDRAM 200. Further, at the end of the processing of the picture, the ME engine 100 can also issue an interrupt signal to the processor 102 so that the processor 102 can process the results in the SDRAM 200 and prepare commands associated with the next level of search, if necessary.

Although the ME engine 100 off loads much of the motion estimation processing, the processor 102 still retains a full control of critical search parameters, including the number of levels, search regions and range, target size, horizontal and vertical decimation, field versus frame search, among others. Hence, the ME engine 100 provides the flexibility of a processor controlled search engine, along with the performance of a hard wired engine.

Figure 3:
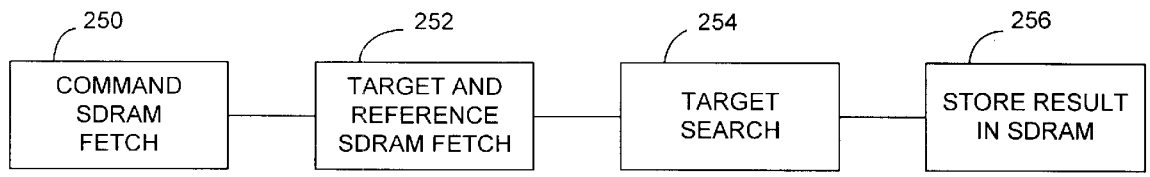
FIG. 3 is a diagram illustrating a motion estimation command processing pipeline.

The command processing pipeline for motion estimation engine 100 is illustrated in more detail in FIG. 3. In step 250, commands in the SDRAM are fetched. Next, target and reference data in the SDRAM 200 are fetched in step 252. From step 252, the target search is performed in step 254 and the result of the target search is stored back to the SDRAM 200 in step 256. When all the search commands have been processed, an interrupt is generated to the processor 102 so that the processor 102 can read results from the SDRAM 200 and set up search commands for the next level of hierarchical search. Thus, the ME engine 100 operates as an autonomous unit with minimum intervention from the processor 102. The results may be used to generate search commands for the next level of a hierarchical search or for motion compensation in the video DSP 104. Further, the generation of commands for the motion estimation engine 210 by the processor 102 may be overlapped with the DCT phase of macroblock encoding when the processor 102 is not needed to supervise the video DSP 104.

Figure 4:
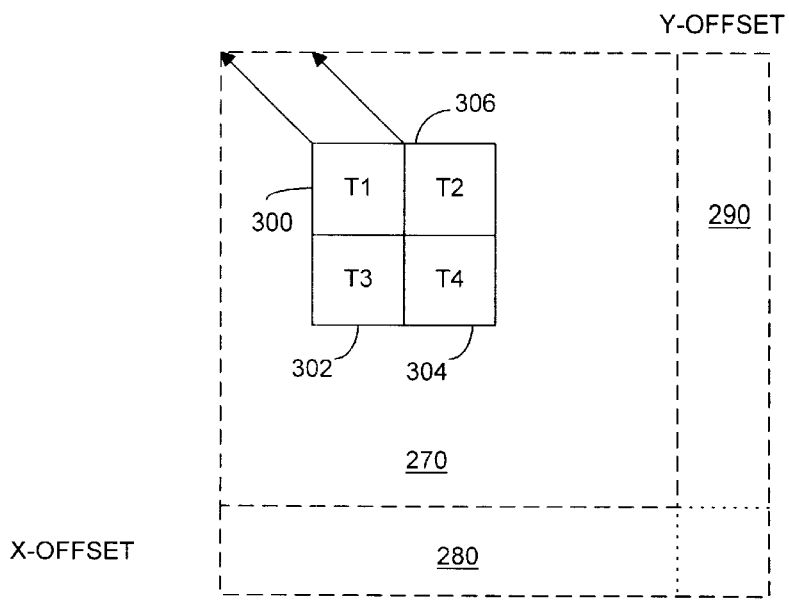
FIG. 4 is a diagram illustrating a sharing of a reference window among four adjacent targets in the motion estimation engine of FIG. 2.

Turning now to FIG. 4, the ME engine 100 also supports a split search command, where two or four search targets with common starting displacements may be searched using a single command to produce two or four search results. Split search commands allow the reference fetches to be shared by all targets in the split command. This action reduces the bandwidth loading on the bus 101 by up to four times and thus generates a significant performance gain.

In FIG. 4, a target T1 300 is shown with respect to a reference area 270. Field targets may be either 8×8 pels or 8×16 pels, while frame targets may be either 8×8 pels or 16×16 pels. In a conventional search, the search engine 210 (FIG. 2) repetitively applies the target T1 300 to the reference area 270 during the motion estimation process. In a split search, multiple targets T1 300, T2 306, T3 302 and T4 304 may share a portion of a common reference area 270. Further, the additional targets T2 306, T3 302 and T4 304 may need to search additional areas 280 or 290. To support the split search, a composite reference area consisting of areas 270, 280 and 290 are loaded into the reference memory WMEM 212 or 213 for use by the multiple search targets. Typically, the areas 280 and 290 extend the dimensions of the area 270 by eight pels in the horizontal and vertical directions.

During a split search, if the previous level horizontal resolution is half of the current level and the horizontal target size is the same, then two adjacent horizontal targets such as targets T1 300 and T2 306 can share the same data. This is called horizontal splitting. Similarly, if the previous level vertical resolution is half the current level and the vertical target size is the same, then two vertically adjacent targets such as T1 300 and T3 302 can share the same data. Vertical and horizontal splitting may occur at the same time, allowing up to four targets to share the same search region. Each split search command causes the WMEM 212 or 213 to be loaded with the composite reference areas 270, 280 and 290. The split search command will generate multiple results for targets that share the same reference data.

During the multiple hierarchical search of MPEG encoding, results generated during the current hierarchical search may be used in specifying subsequent search operations. In the ME engine 100, ME search commands and results preferably share a similar format so that the result from the current ME search can be used as the search command of the next stage of the hierarchical ME search process with minimum changes. Moreover, both command and result take the same memory size. In one embodiment, the command and result words are 32-bit in size.

Figure 5:
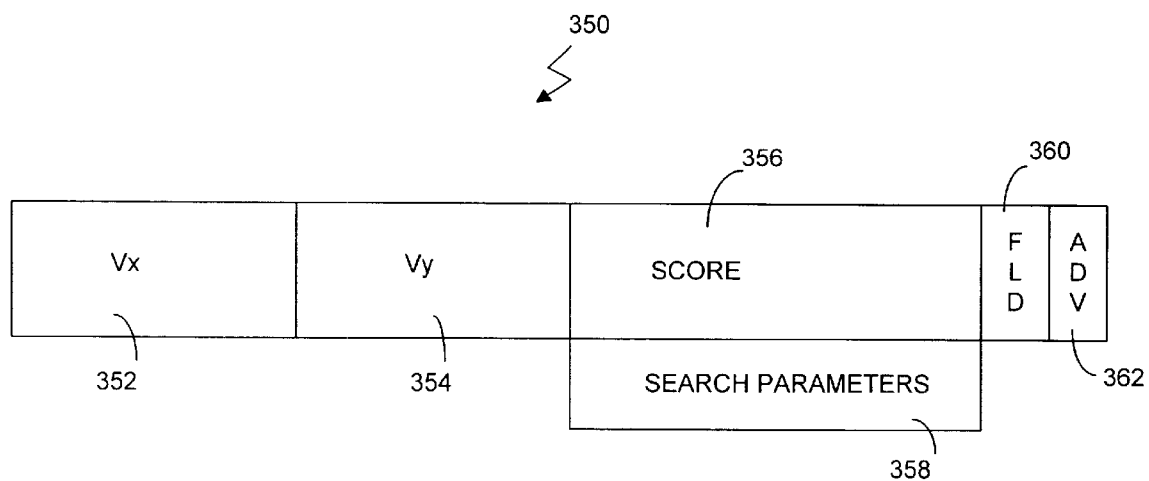
FIG. 5 is a diagram illustrating a shared format for encoding motion estimation search commands and results in the motion estimation engine of FIG. 2.

As shown in FIG. 5, each command or result format 350 has a horizontal displacement field $V_X$ 352, a vertical displacement field $V_Y$ 354, a score field 356, and a search parameter field 358. The $V_X$ field 352 and the $V_Y$ field 354 accept two's complement values in half pel units. If a search is to be performed, the $V_X$ field 352 specifies a horizontal displacement of the center of the search region in the reference frame from the center of the current target in the target frame. Alternatively, if the $V_X$ field 352 is to store the result of a search command, the $V_X$ field 352 represents the horizontal component of the motion vector. Correspondingly, as part of a search command, the $V_Y$ field 354 specifies a vertical displacement of the center of the search region in the reference frame from the center of the current target in the target frame. When used to store results of the operation, the $V_Y$ field 354 specifies a vertical component of the motion vector. Generally, the search command for a first stage of a hierarchical search set the $V_X$ field 352 and the $V_Y$ field 354 to zero. Latter stage search commands may use results stored in the $V_X$ and $V_Y$ fields 352 and 354 from the current search.

The score field 356 contains a compressed sum of the absolute difference of each pixel in the target and each pixel in the reference for the velocity specified by the $V_X$ and $V_Y$ fields 352 and 354. The score field 356 is used by the processor 102 to select the best strategy when multiple search candidates are being considered. The score field 356 is only present as part of a result command. The search parameter field 358 is part of a search command which specifies additional search parameters. Additionally, the search command or result format 350 may specify a field (FLD) bit 360 and an advance (ADV) bit 362. When set, the FLD bit 360 indicates that the operation relates to a field search command or result. When cleared, the FLD bit 360 indicates that the operation relates to a frame search command or result. The ADV bit 362 is set on the last search command for the current target and reference picture. When the ADV bit is set, the search direction is reversed. When not advancing, the same split targets are reused for additional reference region searches.

The common format in commands and results allows results of the current search to be used as part of the next search command in the sequence of hierarchical search or for motion compensation. The ease in revising results eliminates unnecessary processing and restoring of intermediate search results, thus enhancing performance.

Additionally, a merge bit field is provided in the ME engine search commands. If set, the current search command is merged with the next search command by accumulating the score for each search position of the two commands. Accumulated scores are clamped to a maximum representable score in the result if an overflow occurs. The next search command will produce a single combined result, unless it also has the merge bit set in which case accumulation continues with the following command, etc. Merged same parity searches use the same input vector for both searches to produce the common vector. Merged opposite parity searches use an if appropriately scaled common vector to produce the common vector.

Figure 6:
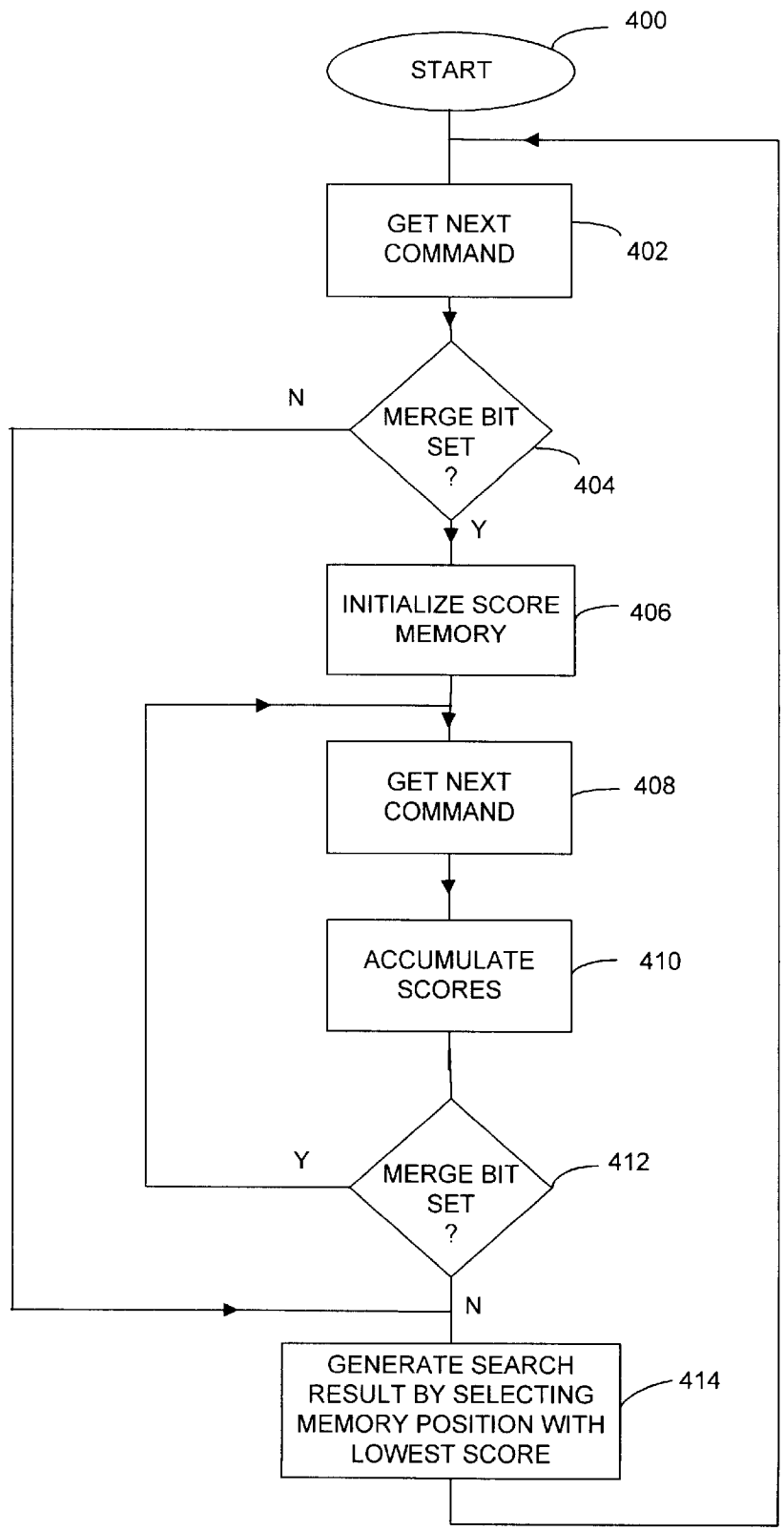
FIG. 6 is a flowchart illustrating a process for performing merged search operations in dual prime motion estimation.

FIG. 6 is a flowchart illustrating a process for performing merged search operations in accordance with the merge bit. Upon entry to the process 400, the next command in the ME engine is retrieved in step 402. Next, the merge bit field is tested to see if the field has been set in step 404. If so, this is the start of a new merged search operation and the score memory is initialized in step 406. The next command is obtained in step 408 and scores are accumulated into the score memory in step 410. The merge bit field of the next command is tested to see if it is set in step 412. If so, this is simply a continuation of the merged search operation and the process loops back to step 408 to continue the accumulate score operation. In step 412, in the event that the merge bit is cleared, indicating that the merged search operation has completed, the process of FIG. 6 proceeds to step 414 where it generates a search result by selecting from the score memory a memory position with the lowest score. Step 414 is also reached from step 404 in the event that the merge bit is cleared. From step 414, the process of FIG. 6 loops back to step 402 to continue the processing of additional commands to the ME engine.

Special grids are also provided for coordinated opposite parity field searches, including a ¾ pel grid and ¼ pel grid. The grids are used when the corresponding same parity field searches are being conducted at half pel resolution. Additionally, a set of search commands are provided to optimize the dual prime motion estimation process. The motion search command has a QP specification field which is used in conjunction with the grids.

The ¾ pel search grid is used for searches from the last temporal field of the target to the first temporal field of the reference. The ¾ pel grid is actually an alternating pel ½ pel, 1 a pel offset grid. If a QP(x,y) bit is set in the motion search command to specify a ¼ pel input for x and y velocity offsets, (x,y) grid pel offsets generated from the input velocity point are −5/2, −3/2, −1,0 (input velocity point), ½, 3/2. Otherwise the grid pel offsets are −2, −3/2, −½, 0 (input velocity point), 1, 3/2, 5/2.

The ¼ pel grid is used for searches from the first temporal field of the target to the last temporal field of the reference. The ¼ pel grid is generated by duplicating ½ pel search scores to four grid points. If QP(x,y) is set, then the grid (x,y) pel offsets from the input velocity point are −1, −½, −½, 0 (input velocity point), 0, ½, ½. Otherwise the grid pel offsets are −½, −½, 0, 0 (input velocity point), ½, ½, 1.

Figure 7:
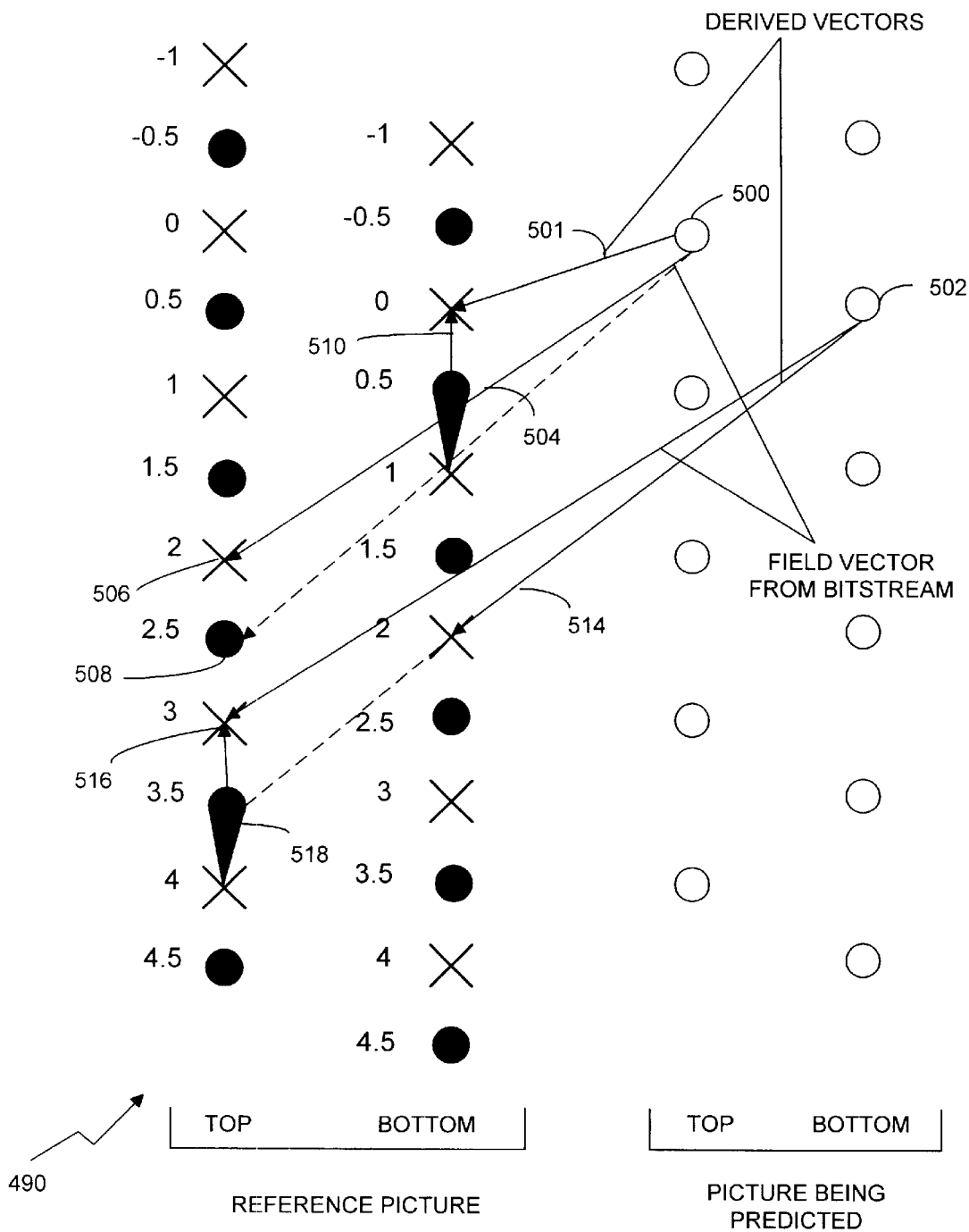
FIG. 7 is a diagram illustrating special grids used for coordinated same and opposite parity field search operations in dual prime motion estimation.

FIG. 7 is a diagram illustrating the quarter point grids for coordinated same and opposite parity field search operations. A top field and a bottom field of a reference picture, as well as a top field and a bottom field of a picture which is being predicted by the ME engine, are shown in FIG. 7. The top and bottom fields of the picture being predicted has a plurality of data points, including points 500 and 502. Similarly, the top and bottom fields of the referenced picture has a plurality of points that are to be mapped to and whose coordinates may be represented as a series of vectors from the points of the picture being predicted. From the point 500, a derived vector 501 is derived from a common vector 504.

The search initially computes the scores for the common vector 504 and the derived vector 501 together and assuming that a differential vector 510 is zero during this common vector search. Moreover, the search attempts to minimize the overall score. As the differential vector 510 is zero for this part of the search, each common vector position determines the corresponding derived vector. And in particular, in each direction there will be two common vector points that will have the same derived vector because of a truncation due to the use of the half pel grid. Hence, the opposite parity search, which is essentially a search in the derived vector space, can duplicate each result obtained to two positions in an associated common vector score memory.

The process for arriving at a vector 514, which is a bottom to bottom field vector, is analogous, except that due to the length of the vector, instead of being ¼ grid it has a ¾ grid because the scaling of 3/2 is applied to the common vector to generate the derived vector. Hence, each time the search engine shifts by one grid point, which is a ½ pel in the common vector, the search engine will either shift by 1 pel or ½ a pel for the derived vector. Hence, the search engine needs to only search particular offsets from the starting point.

Moreover, in order to form a motion vector for opposite parity fields, that is the bottom field of the reference picture and the top field of the picture being predicted or vice versa, an existing motion vector 504 is scaled to reflect a different temporal distance between the fields. A correction is made to a vertical component to reflect the vertical shift between lines of the top field and the bottom field and then a small differential motion vector 510 is added.

Figure 8:
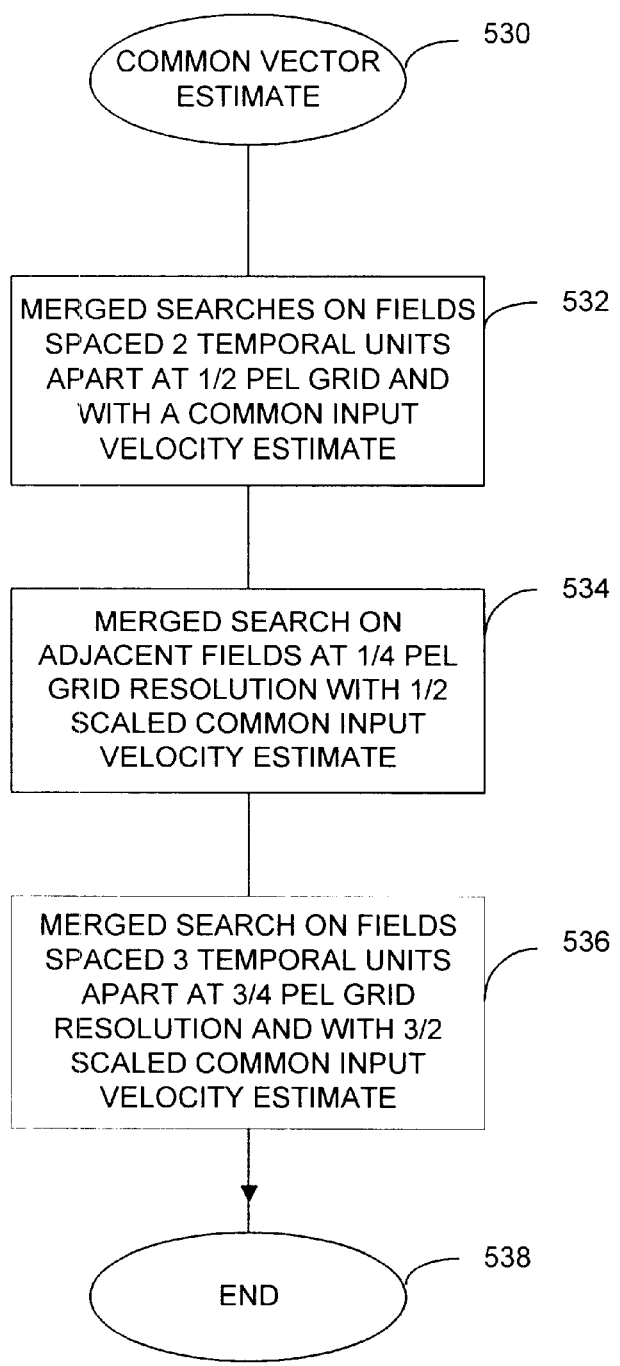
FIG. 8 is a flowchart illustrating a process for estimating a common vector in dual prime motion estimation.

Referring now to FIG. 8, a process 530 for estimating a common vector is shown. The process 530 performs four merged searches, two of which are based on fields spaced two temporal units apart, one search on adjacent fields, and final search on fields spaced three temporal units apart. Thus, in step 532, the process 530 performs two merged searches on fields that are spaced two temporal units apart at a ½ pel grid resolution and with a common input velocity estimate. Next, the process 530 performs a merge search operation on adjacent fields at ¼ pel grid resolution with ½ scale common input velocity estimate. From step 534, the process 530 then performs a merge search operation on fields spaced three temporal units apart at ¾ pel grid resolution and with 3/2 scaled common input velocity estimate. Finally, the process 530 exits in step 538.

Figure 9:
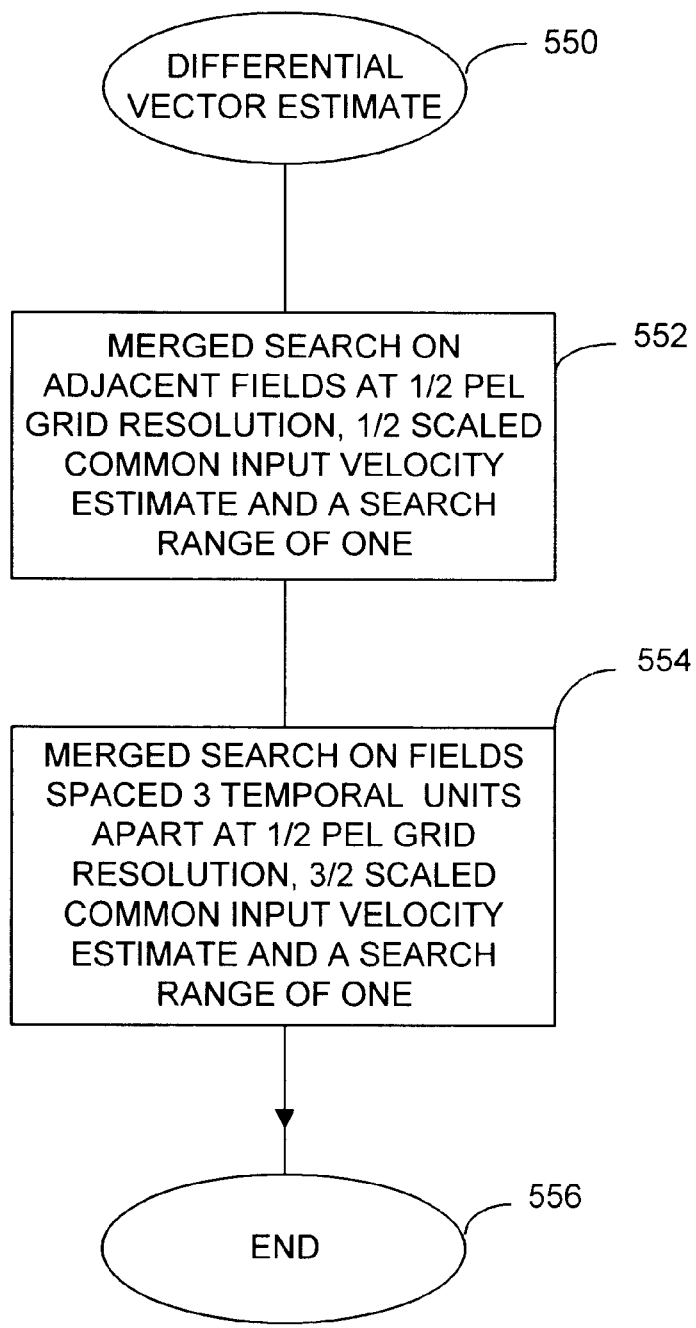
FIG. 9 is a flowchart illustrating a process for estimating a differential vector in dual prime motion estimation.

A corresponding flow chart showing a process 550 for performing a differential vector estimation is shown in FIG. 9. In the process 550, a merge search operation is performed on adjacent fields at ½ pel grid resolution and a ½ scaled common input velocity estimate. Moreover, the search operation is performed with a search range of one. Next, the process 550 performs a merged search operation on fields that are spaced three temporal units apart in step 554. In this step, the search operation is performed using a pel ½ grid resolution and a 3/2 scaled common input velocity estimate. Furthermore, the search operation is performed with a search range of one. Finally, the process of FIG. 9 exits in step 556.

As an example for the processes of FIGS. 8 and 9, if the current target is from the top field, and the top field is the first field in the frame, to estimate the common vector, the following four merged search commands are performed:

top target to top reference, ½ pel grid, common input velocity estimate bottom target to bottom reference, ½ pel grid, same input velocity as previous top target to bottom reference, ¼ pel grid, ½ scaled common input velocity bottom target to top reference, ¾ pel grid, 3/2 scaled common input velocity To estimate the differential vector, the following two merged search commands are performed:

top target to bottom reference, ½ pel grid, ½ scaled common velocity, search range one bottom target to top reference, ½ pel grid, 3/2 scaled common velocity, search range one.

The double buffering of the reference window memory, the target memory and result memory results in a performance advantage, as the motion estimation processing can operate on data stored in one set of the double-buffered memory devices while the other set can load data from a system memory. Hence, latencies associated with the system memory access are hidden from the operation of the motion estimation engine.

Additionally, the common format in commands and results allows the results of the current search to be used as part of the next search command in the sequence of hierarchical search or for motion compensation. The ease of reusing the fields of the current result eliminates unnecessary processing of intermediate search results, thus enhancing performance. Moreover, the split search command capability allows the reference and target fetches to be shared by all targets in the split search command. This feature reduces unnecessary fetches and bus loading by up to four times. In combination, the double buffering of the memory subsystem, the shared command/result format, and the split search capability, enable the apparatus to off-load much of the dual prime motion estimation processing from the processor while allowing the processor to retain full control of critical search parameters. Thus, flexibility is preserved without affecting performance in the system.

The techniques described here may be implemented in hardware or software, or a combination of the two. Software may include microcode or conventional program implemented in a high level procedural or object-oriented programming language to communicate with a computer system. However, the programs can be implemented in assembly or machine language, if desired.

In the event the techniques are implemented in computer programs executing on programmable computers with a processor, a storage medium readable by the processor (including volatile and nonvolatile memory and/or storage elements), and suitable input and output devices, the program code is applied to data from an input device such as a video camera to perform the functions described and to generate motion estimation output information to be saved on a data storage device or transmitted over a medium.

While the invention has been shown and described with reference to one or more embodiments thereof, those skilled in the art will understand that the above and other changes in form and detail may be made without departing from the spirit and scope of the following claims.

What is claimed is:

1. An apparatus for performing motion estimation, comprising:
   a command memory for storing a motion estimation command list segment, said segment having a search command for specifying a merged search operation over one or more search positions, wherein a merged search operation allows the score of a current search position to be accumulated with the score of one or more previous search positions;
   a score memory for storing results of the merged search operation, said score memory being initialized when the merged search operation is initiated, said score memory accumulating a result for each search position during a subsequent merged search operation; and
   a search engine coupled to the command memory and to the score memory, said search engine determining from the score memory a search position with the lowest score.

2. The apparatus of claim 1, wherein the search command has a merge bit to select the merged search operation.

3. The apparatus of claim 2, wherein the score memory is initialized when the merge bit of a current search command is set and the merge bit of a previous search command is cleared.

4. The apparatus of claim 2, wherein the score memory accumulates the result for each search position when the merge bit of the previous search command is set.

5. The apparatus of claim 2, wherein the search position with the lowest score is determined when the merge bit of a current search command is cleared and the merge bit of a previous command is set.

6. The apparatus of claim 1, further comprising means for estimating a common vector using merged search operations on fields spaced two temporal units apart at a first pel grid resolution with a common input velocity estimate.

7. The apparatus of claim 6, wherein the first pel grid resolution is a ½ pel grid resolution.

8. The apparatus of claim 6, further comprising means for estimating a common vector using additional merged search operations on adjacent fields at a second pel grid resolution with a first scaled common input velocity estimate and merged search operations on fields spaced three temporal units apart at a third pel grid resolution with a second scaled common input velocity estimate.

9. The apparatus of claim 8, wherein the second pel grid resolution is a ¼ pel grid resolution and the first scaled common input estimate is ½ of the common input velocity estimate.

10. The apparatus of claim 9, wherein the third pel grid resolution is a ¾ pel grid resolution and the second scaled common input estimate is 3/2 of the common input velocity estimate.

11. The apparatus of claim 1, wherein the apparatus estimates a differential vector using a merged search operation on adjacent fields at a predetermined pel grid resolution with a first scaled common input velocity estimate and a predetermined search range; and
    a merged search operation on fields spaced three temporal units apart at the predetermined pel grid resolution with a second scaled common input velocity estimate and the predetermined search range.

12. The apparatus of claim 11, wherein the predetermined pel grid resolution is a ½ pel grid resolution.

13. The apparatus of claim 11, wherein the first scaled common input velocity estimate is ½ of the common input velocity estimate.

14. The apparatus of claim 11, wherein the second scaled common input velocity estimate is 3/2 of the common input velocity estimate.

15. The apparatus of claim 11, wherein the predetermined search range is one.

16. The apparatus of claim 1, wherein the search engine compensates for differing search grid resolutions between same and opposite parity motion vector searches.

17. The apparatus of claim 16, wherein temporally adjacent fields are compensated by duplicating a search result to four score memory positions.

18. A method for performing motion estimation based on a reference image and a target image, each image having one or more search positions, the method comprising:
   initializing a score memory when a merged search operation is initiated, wherein the merged search operation allows the score of a current search position to be accumulated with the score of one or more previous search positions; and
   repetitively accumulating the result for each search position into the score memory for each merged search.

19. The method of claim 18, further comprising selecting the search position with the lowest score as an output.

20. The method of claim 19, wherein the selecting step is performed simultaneously with a final accumulation.

21. The method of claim 18, further comprising compensating for differing search grid resolutions between same and opposite parity motion vector searches.

22. The method of claim 21, wherein the compensating step for adjacent fields duplicates a search result to four score memory positions.

23. The method of claim 22, wherein two of the duplicated score memory positions are horizontally adjacent.

24. The method of claim 22, wherein two of the duplicated score memory positions are vertically adjacent.

25. The method of claim 23, wherein two of the duplicated score memory positions are vertically adjacent and two of the score memory positions are horizontally adjacent.

26. An apparatus for performing motion estimation based on a reference image and a target image, comprising:
- a command memory for storing a motion estimation command list segment, said segment having a search command for specifying a merged search operation over one or more search positions, wherein a merged search operation allows the score of a current search position to be accumulated with the score of one or more previous search positions;
- a score memory for storing results of the merged search operation, said score memory being initialized when the merged search operation is initiated, said score memory accumulating a result for each search position during a subsequent merged search operation; and
- a search engine coupled to the command memory and to the score memory, said search engine determining from the score memory a search position with the lowest score and producing a motion estimation result list, the search engine having:
  - a reference window memory system containing one or more reference data segments;
  - a target memory system containing one or more target data segments; and
  - a data path engine coupled to the reference window memory system and the target memory system, the data path engine generating a measure of differences between data in the reference window memory system and data stored in the target memory system; and
- a result memory system coupled to the motion estimation search engine, said result memory system storing one or more result list segments.

27. The apparatus of claim 26, wherein the command list segment and the result list segment use an identical format for a search starting point in the command list segment and a motion vector in the result list segment.

28. The apparatus of claim 26, wherein the format for performing hierarchical searches includes a horizontal displacement field, a vertical displacement field, a score field, a search parameter field, a field bit, and an advance bit.

29. The apparatus of claim 26, wherein the reference window memory allows reference data to be shared between a plurality of targets.

30. The apparatus of claim 26, wherein the shared targets are vertically adjacent, horizontally adjacent, or a combination thereof.

* * * * *